(12) United States Patent
Levasseur

(10) Patent No.: US 8,276,364 B2
(45) Date of Patent: Oct. 2, 2012

(54) BLADDER TYPE VARIABLE AREA FAN NOZZLE

(75) Inventor: Glenn Levasseur, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/440,623

(22) PCT Filed: Oct. 12, 2006

(86) PCT No.: PCT/US2006/039807
§ 371 (c)(1),
(2), (4) Date: Dec. 29, 2009

(87) PCT Pub. No.: WO2008/045057
PCT Pub. Date: Apr. 17, 2008

(65) Prior Publication Data
US 2010/0139240 A1    Jun. 10, 2010

(51) Int. Cl.
*F02K 3/02* (2006.01)
(52) U.S. Cl. .................................... 60/262; 239/265.39
(58) Field of Classification Search .................... 60/262, 60/39.281, 735, 745, 771, 226.3, 226.1; 137/84, 137/85; 239/265.39
See application file for complete search history.

(56) References Cited

U.S. PATENT DOCUMENTS

| | | | |
|---|---|---|---|
| 3,279,192 A | | 10/1966 | Hull et al. |
| 3,622,075 A | | 11/1971 | Harris et al. |
| 3,721,389 A | * | 3/1973 | MacKinnon et al. ..... 239/265.19 |
| 3,785,567 A | | 1/1974 | Fisher |
| 3,913,626 A | | 10/1975 | McMurtry |
| 3,988,889 A | * | 11/1976 | Chamay et al. .............. 60/226.2 |
| 5,226,455 A | | 7/1993 | duPont |
| 2003/0126856 A1 | * | 7/2003 | Lair ............................... 60/262 |
| 2009/0208328 A1 | * | 8/2009 | Stern ............................. 415/145 |

FOREIGN PATENT DOCUMENTS

| | | |
|---|---|---|
| EP | 1703114 A1 | 9/2006 |
| GB | 1106077 | 3/1968 |

OTHER PUBLICATIONS

Search Report and Written Opinion mailed on May 30, 2007 for PCT/US2006/039807.
Notification of Transmittal of The International Preliminary Report on Patentability mailed on Nov. 3, 2008 for PCT/US2006/039807.

\* cited by examiner

*Primary Examiner* — William H Rodriguez
*Assistant Examiner* — Vikansha Dwivedi
(74) *Attorney, Agent, or Firm* — Carlson, Gaskey & Olds, P.C.

(57) ABSTRACT

A variable fan nozzle for use in a gas turbine engine includes a nozzle section, such as an inflatable bladder, associated with a fan bypass passage for conveying a bypass airflow. The nozzle section has an internal fluid pressure that is selectively variable to influence the bypass airflow.

30 Claims, 3 Drawing Sheets

BLADDER TYPE VARIABLE AREA FAN NOZZLE

BACKGROUND OF THE INVENTION

This invention relates to gas turbine engines and, more particularly, to a gas turbine engine having a variable fan nozzle for controlling a bypass airflow through a fan bypass passage of the gas turbine engine.

Gas turbine engines are widely known and used for power generation and vehicle (e.g., aircraft) propulsion. A typical gas turbine engine includes a compression section, a combustion section, and a turbine section that utilize a core airflow into the engine to generate power or propel the vehicle. The gas turbine engine is typically mounted within a housing, such as a nacelle. A bypass airflow flows through a passage between the housing and the engine and exits from the engine at an outlet.

Presently, conventional gas turbine engines are designed to operate within a desired performance envelope under certain predetermined flight conditions, such as cruise. Conventional engines tend to approach or exceed the boundaries of the desired performance envelope under flight conditions outside of cruise, such as take-off and landing, which may undesirably lead to less efficient engine operation. For example, the size of the fan and the ratio of the bypass airflow to the core airflow are designed to maintain a desired pressure ratio across the fan during cruise. However, during take-off and landing, the pressure ratio may change such that pressure pulsations occur across the fan (i.e., fan flutter). The pressure pulsations cause less efficient fan operation and increase mechanical stress on the fan, which ultimately causes an increase in fuel consumption and reduces the life expectancy of the fan.

Therefore, there is a need to control the bypass airflow over a wider variety of different flight conditions to enable enhanced control of engine operation.

SUMMARY OF THE INVENTION

An example variable fan nozzle for use in a gas turbine engine includes a nozzle section, such as an inflatable bladder, associated with a fan bypass passage for conveying a bypass airflow. The inflatable bladder of the nozzle section has a contained internal fluid pressure that is selectively variable to influence the bypass airflow. Flaps adjacent the inflatable bladder move in response to changing the internal fluid pressure to control a cross-sectional area of the bypass passage and thereby influence the bypass airflow.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
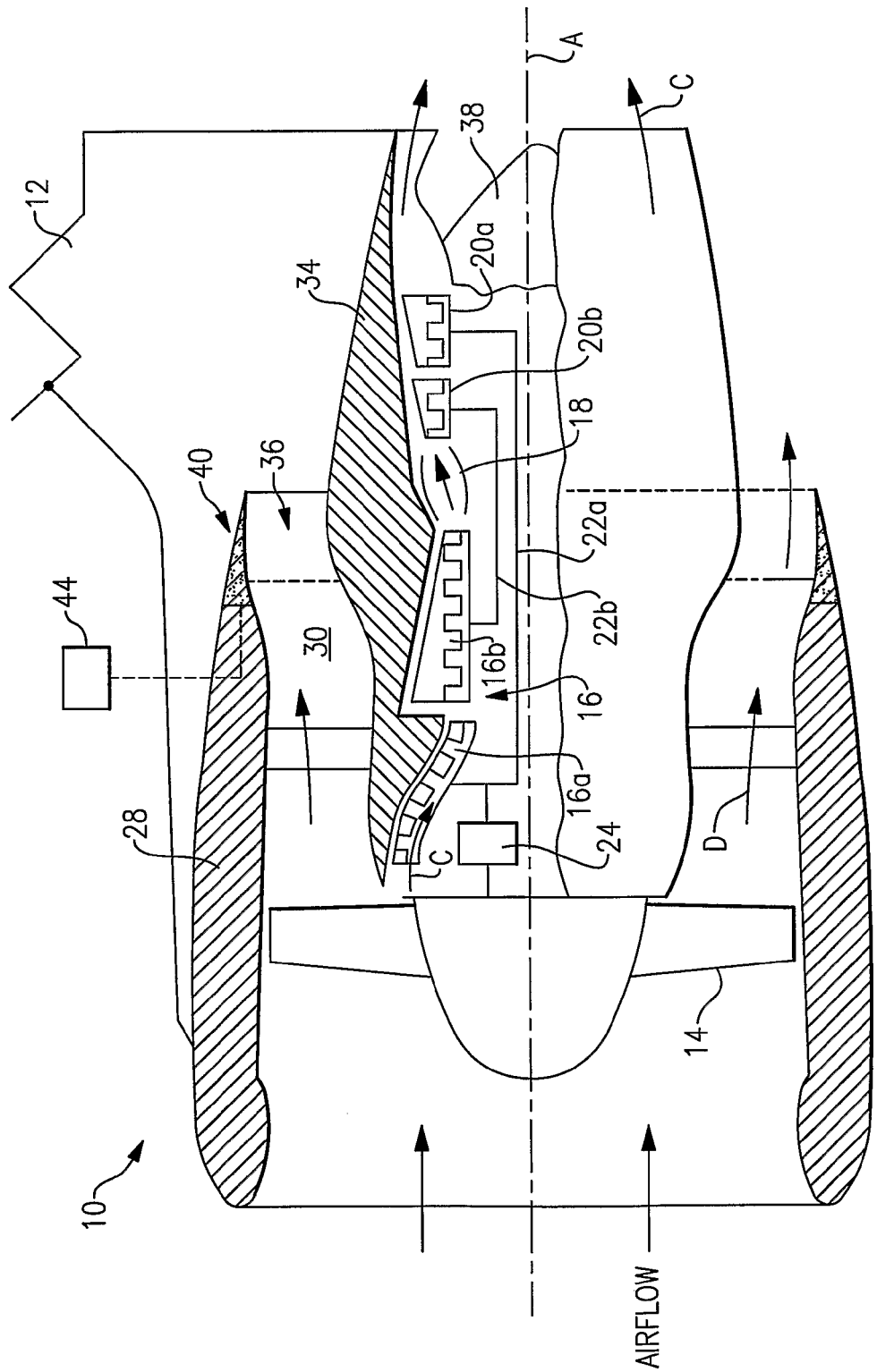
FIG. 1 illustrates selected portions of an example gas turbine engine system having a nozzle for influencing a bypass airflow.

FIG. 1 illustrates a schematic view of selected portions of an example gas turbine engine 10 suspended from an engine pylon 12 of an aircraft, as is typical of an aircraft designed for subsonic operation. The gas turbine engine 10 is circumferentially disposed about an engine centerline, or axial centerline axis A. The gas turbine engine 10 includes a fan 14, a low pressure compressor 16a, a high pressure compressor 16b, a combustion section 18, a low pressure turbine 20a, and a high pressure turbine 20b. As is well known in the art, air compressed in the compressors 16a, 16b is mixed with fuel that is burned in the combustion section 18 and expanded in the turbines 20a and 20b. The turbines 20a and 20b are coupled for rotation with, respectively, rotors 22a and 22b (e.g., spools) to rotationally drive the compressors 16a, 16b and the fan 14 in response to the expansion. In this example, the rotor 22a also drives the fan 14 through a gear train 24.

In the example shown, the gas turbine engine 10 is a high bypass turbofan arrangement. In one example, the bypass ratio is greater than 10, and the fan 14 diameter is substantially larger than the diameter of the low pressure compressor 16a. The low pressure turbine 20a has a pressure ratio that is greater than 5, in one example. The gear train 24 can be any known suitable gear system, such as a planetary gear system with orbiting planet gears, planetary system with non-orbiting planet gears, or other type of gear system. In the disclosed example, the gear train 24 has a constant gear ratio. Given this description, one of ordinary skill in the art will recognize that the above parameters are only exemplary and that other parameters may be used to meet the particular needs of an implementation.

An outer housing, nacelle 28, (also commonly referred to as a fan nacelle) extends circumferentially about the fan 14. A generally annular fan bypass passage 30 extends between the nacelle 28 and an inner housing, inner cowl 34, which generally surrounds the compressors 16a, 16b and turbines 20a, 20b.

In operation, the fan 14 draws air into the gas turbine engine 10 as a core flow, C, and into the bypass passage 30 as a bypass air flow, D. In one example, approximately 80 percent of the airflow entering the nacelle 28 becomes bypass airflow D. A rear exhaust 36 discharges the bypass air flow D from the gas turbine engine 10. The core flow C is discharged from a passage between the inner cowl 34 and a tail cone 38. A significant amount of thrust may be provided by the bypass airflow D due to the high bypass ratio.

The example gas turbine engine 10 shown FIG. 1 also includes a nozzle 40 (shown schematically) associated with the bypass passage 30. In this example, the nozzle 40 is near a trailing edge of the nacelle 28, however, in other examples, the nozzle 40 is located farther forward but aft of the fan 14. In this example, the nozzle 40 is coupled with the nacelle 28. Alternatively, the nozzle 40 is coupled with the inner cowl 34, or other suitable structural portion of the gas turbine engine 10.

The nozzle 40 is moveable between a plurality of positions to influence the bypass air flow D, such as to manipulate an air pressure of the bypass air flow D. A controller 44 commands the nozzle 40 to selectively move the nozzle 40 among the plurality of positions to manipulate the bypass air flow D in a desired manner. The controller 44 may be dedicated to controlling the nozzle 40, integrated into an existing engine controller within the gas turbine engine 10, or be incorporated with other known aircraft or engine controls. For example, selective movement of the nozzle 40 permits the controller 44 to vary the amount and direction of thrust provided, enhance conditions for aircraft control, enhance conditions for operation of the fan 14, or enhance conditions for operation of other components associated with the bypass passage 30, depending on input parameters into the controller 44.

In one example, the gas turbine engine 10 is designed to operate within a desired performance envelope under certain predetermined conditions, such as cruise. For example, the fan 14 is designed for a particular flight condition—typically cruise at 0.8 Mach and 35,000 feet. The fan 14 is designed at a particular fixed stagger angle for an efficient cruise condition. The nozzle 40 is operated to influence the bypass airflow D such that the angle of attack or incidence on the fan 14 is maintained close to design incidence at other flight conditions, such as landing and takeoff, thus enabling a desired engine operation over a range of flight condition with respect to performance and other operational parameters such as noise levels. In one example, it is desirable to operate the fan 14 under a desired pressure ratio range (i.e., the ratio of air pressure forward of the fan 14 to air pressure aft of the fan 14) to avoid fan flutter. To maintain this range, the nozzle 40 is used to influence the bypass airflow D to control the air pressure aft of the fan 14 and thereby control the pressure ratio. In some examples, the nozzle varies a cross-sectional area associated with the rear exhaust 36 of the bypass passage 30 by approximately 20% to influence the bypass airflow D.

Figure 2:
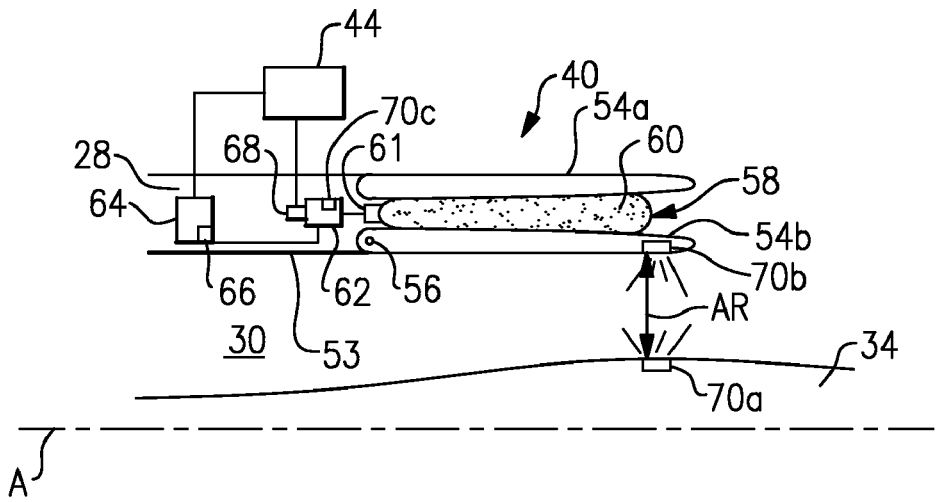
FIG. 2 illustrates an example nozzle having an inflatable bladder for moving nozzle flaps, wherein the inflatable bladder is deflated.
Figure 3:
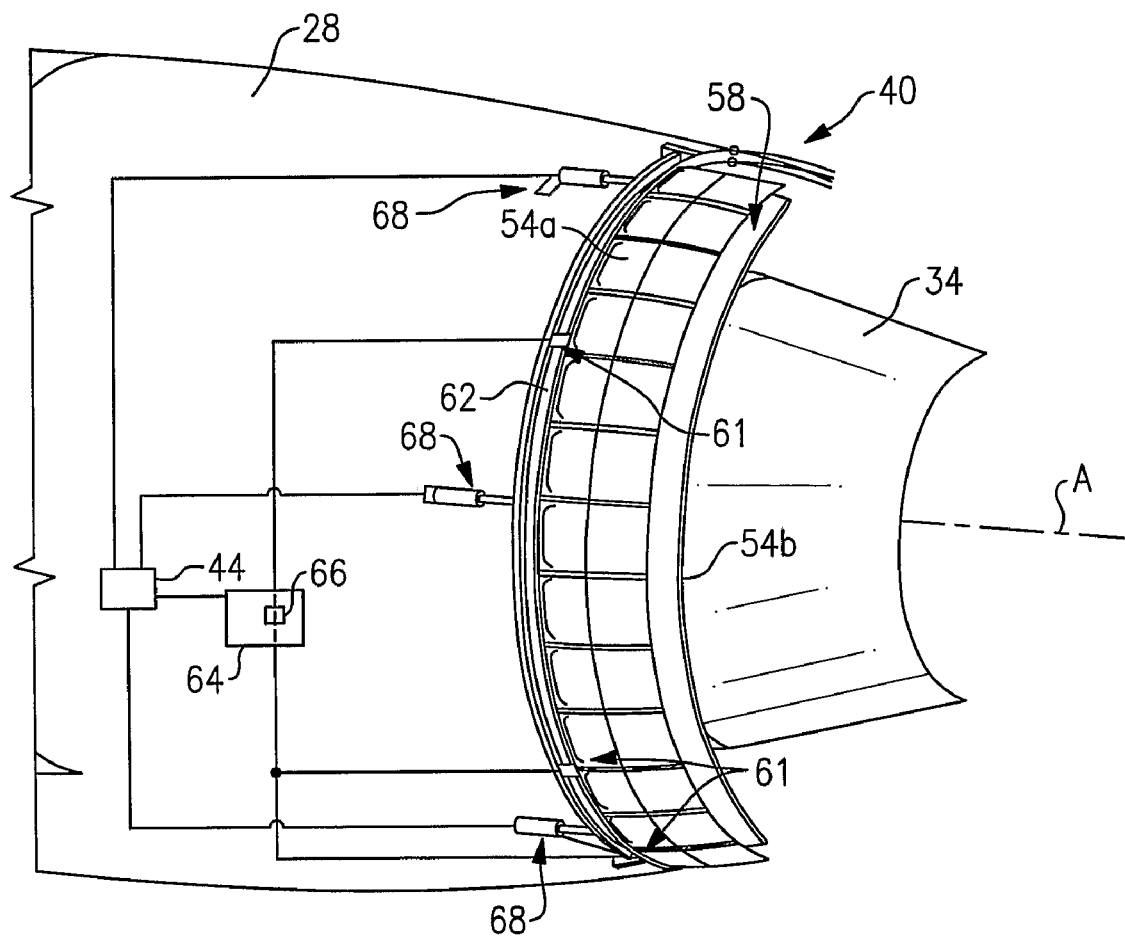
FIG. 3 illustrates a perspective view of the example nozzle and inflatable bladder.

FIGS. 2 and 3 illustrate selected portions of an example nozzle 40 having first flaps 54a and corresponding second flaps 54b that are located radially inwards of the first flaps 54a relative to centerline axis A. In this example, the first flaps 54a are fixed relative to the nacelle 28 and the second flaps 54b are moveably connected to the nacelle 28 at hinges 56 entirely around the circumference of the nacelle 28, however, in another example, the first flaps 54a are also moveably connected using similar type of hinges. The nacelle includes a radially innermost wall 53 adjacent the bypass flow path 30. Alternatively, another connection of a known type is used instead of the hinges 56.

The flaps 54a and 54b are spaced apart in a radial direction. At least one inflatable bladder 58 (i.e. nozzle section) is located between and abuts the flaps 54a and 54b. In one example, a plurality of the bladders 58 are used. For example, one bladder 58 extends about half the distance around the circumference in between some of the flaps 54a and 54b and another bladder 58 extends about the remaining half of the circumference between other of the flaps 54a and 54b. In another example, one bladder 58 is located between each flap 54a and its corresponding flap 54b (i.e., the flap 54b directly radially inwards). Using fewer bladders 58 may lower the overall expense of the bladders 58 and provide the benefit of fewer parts to install. However, using more bladders 58 provides the benefit of having to disassemble fewer flaps 54a and 54b in the event that one of the bladders 58 requires maintenance or replacement. One of ordinary skill in the art who has the benefit of this disclosure will be able to select an appropriate number of the bladders 58 to meet their particular needs.

The bladder 58 (hereafter also including a plurality of the bladders 58) has flexible walls 60 and is made of a known flexible material, or combination of materials, that is suitable for holding a fluid without significant fluid permeation through the walls 60.

In this example, the bladder 58 includes fittings 61 that fluidly connect the bladder 58 with a supply manifold 62, which is fluidly connected with a pressurized fluid source 64. The pressurized air source 64 includes one or more valves 66 for controlling pressurized fluid flow from the pressurized fluid source 64 to the supply manifold 62. The one or more valves 66 are in communication with the controller 44 for selectively inflating the bladder 58. The supply manifold 62 includes bleed valves 68 in communication with the controller 44 for selectively deflating the bladder 58.

Figure 4:
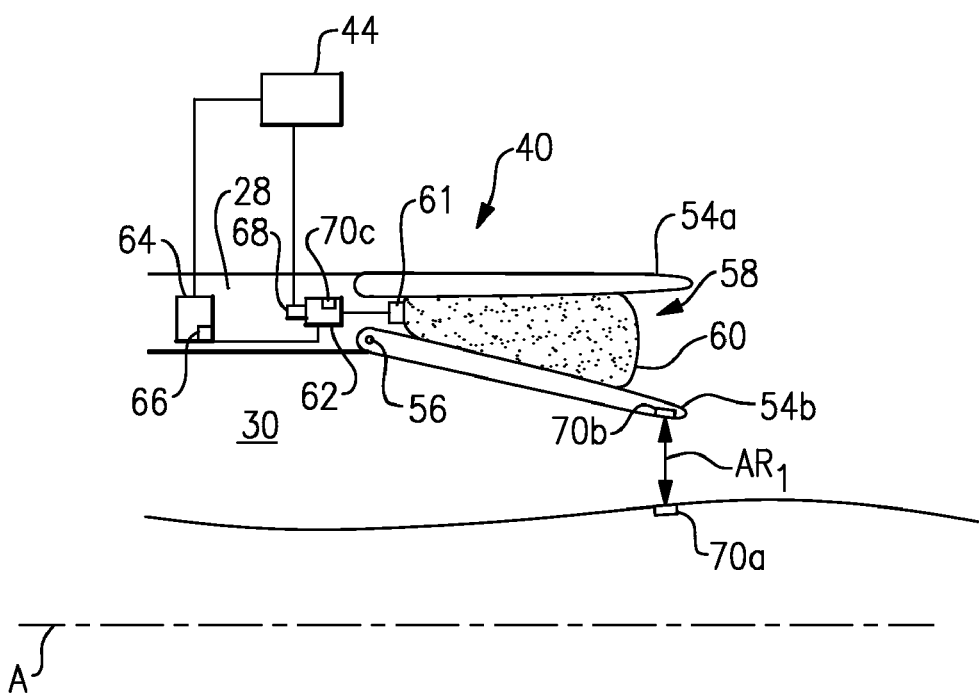
FIG. 4 illustrates the example nozzle, wherein the inflatable bladder is inflated.

In this example, the second flap 54b defines a cross-sectional area, AR, between the inner surface of the second flap 54b and the outer surface of the inner cowl 34. In operation, the controller 44 selectively inflates or deflates the bladder 58 to vary the cross-sectional area AR. In FIG. 2, the second flap 54b is illustrated in an open position. In FIG. 4, the second flap 54b is illustrated in a closed position. In the open position, the second flap 54b is farther away from the inner cowl 34 for a relatively larger cross-sectional area AR. In the closed position, the second flap 54b is closer to the inner cowl 34 for a relatively smaller cross-sectional area $AR_1$.

To inflate the bladder 58, the controller 44 commands the one or more valves 66 to open for a predetermined period of time, permitting pressurized fluid to flow into the supply manifold 62. The supply manifold evenly distributes the pressurized fluid, such as air, into the bladder 58 or multiple of bladders 58. Inflation of the bladder 58 causes the second flaps 54b to move about the respective hinges 56 from the open position (FIG. 2) to the closed position (FIG. 4), thereby decreasing the cross-sectional area from AR to $AR_1$.

To deflate the bladder 58, the controller 44 commands the bleed valves 68 to open for a predetermined time period, permitting pressurized fluid to exit from the bladder 58 through the supply manifold 62 or to atmospheric pressure. Deflation of the bladder 58 causes the second flaps 54b to move about the respective hinges 56 from the closed position (FIG. 4) to the open position (FIG. 2), thereby increasing the cross-sectional area from $AR_1$ to AR.

Optionally, the controller utilizes one or more sensors 70a, 70b, and 70c to control the bladder 58. Sensor 70a is located near the inner cowl 34 and communicates a signal representing the distance between the inner cowl 34 and the second flap 54b to the controller 44. The controller 44 calculates the cross-sectional area AR, $AR_1$ based upon the signal and selectively controls the bladder 58 to achieve a desired cross-sectional area AR, $AR_1$.

Alternatively, or in addition to sensor 70a, sensor 70b is located near the trailing edge of the second flap 54b and communicates a signal representing the distance between the inner cowl 34 and the second flap 54b to the controller 44, similar to the sensor 70a. In one example, the sensors 70a and 70b are known types of sensors, such as acoustic sensors, laser sensors, electro-optical sensors, or other type of sensor.

Alternatively, or in addition to sensors 70a and 70b, sensor 70c is located within the supply manifold and communicates a signal representing a fluid pressure within the supply manifold 62 to the controller 44. The controller 44 calculates the cross-sectional area AR, $AR_1$ based upon the fluid pressure and selectively controls the bladder 58 to achieve a desired cross-sectional area AR, $AR_1$.

The controller 44 selectively controls the fluid pressure within the bladder 58 to influence the bypass airflow D within the bypass passage 30. For example, moving the second flaps 54b to the closed position for a relatively smaller cross-sectional area AR restricts the bypass airflow D and produces a pressure build-up (i.e., an increase in air pressure) within the bypass passage 30. Moving the second flaps 54b to the open position for a relatively larger cross-sectional area $AR_1$ permits more bypass airflow D and reduces the pressure build-up (i.e., a decrease in air pressure).

Thus, the controller 44 can selectively control the air pressure within the bypass passage 30 to thereby control the pressure ratio across the fan 14. For example, during take-off, the bladder 58 is in an inflated state to achieve a desired pressure ratio that permits the fan 14 to avoid a flutter condition and thereby operate more efficiently.

In one example, the controller 44 also determines whether there is a problem with the bladder 58, such as a puncture. For example, a puncture might cause the bladder 58 to gradually deflate. As a result of the deflation, any of the sensors 70a, 70b, and 70c cause the controller 44 to repeatedly inflate the bladder 58 to compensate for the pressurized fluid lost through the puncture. In one example, the controller 44 generates a fault signal in response to having to inflate the bladder 58 a predetermined number of times over a predetermined time period. For example, the fault signal illuminates an indicator in an aircraft cockpit to warn a pilot of the problem.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A variable fan nozzle for use in a gas turbine engine, comprising:
   a nozzle section associated with a fan bypass passage for conveying a bypass airflow, the nozzle section having an inflatable bladder that is selectively variable to influence the bypass airflow; and
   a first flap abutting the inflatable bladder and a second flap abutting the inflatable bladder, wherein the second flap is radially inwards of the first flap, and wherein the second flap moves between a plurality of positions in response to changes in the inflatable bladder, the first flap and the second flap abutting the inflatable bladder at each of the plurality of positions.

2. The variable fan nozzle recited in claim 1, wherein the inflatable bladder has flexible walls that define a volumetric size that changes depending on a contained internal fluid pressure of the inflatable bladder.

3. The variable fan nozzle of claim 2, wherein the second flap moves radially outwards in response to a decrease in the volumetric size.

4. The variable fan nozzle of claim 2, wherein the second flap moves radially inwards in response to an increase in the volumetric size.

5. The variable fan nozzle recited in claim 1, further comprising a pressurized fluid source connected to the inflatable bladder for selectively providing pressurized fluid to change a contained internal fluid pressure of the inflatable bladder.

6. The variable fan nozzle recited in claim 1, further comprising at least one sensor near the nozzle section that produces a signal representative of a contained internal fluid pressure of the inflatable bladder.

7. The variable fan nozzle recited in claim 1, wherein the inflatable bladder has flexible walls such that the first flap and the second flap move between the Plurality of positions in response to movement of the flexible walls.

8. The variable fan nozzle recited in claim 7, wherein the inflatable bladder comprises a plurality of inflatable bladders connected with a supply manifold and a pressurized fluid source, the supply manifold having at least one bleed valve that releases pressurized fluid from the plurality of inflatable bladders in response to a contained internal fluid pressure of the plurality of inflatable bladders exceeding a threshold pressure.

9. The variable fan nozzle of claim 1, wherein the first flap is a fixed flap and the second flap defines an outer radial side of the fan bypass passage.

10. The variable fan nozzle of claim 1, wherein an increase in a contained internal fluid pressure of the inflatable bladder is in response to a take-off flight condition.

11. The variable fan nozzle of claim 1, wherein at least one sensor adjacent the second flap produces a signal representative of a relative position of the second flap.

12. The variable fan nozzle of claim 1, wherein the first flap moves between a plurality of positions.

13. A gas turbine engine system comprising:
   a fan;
   a nacelle arranged about the fan having a radially innermost wall;
   a gas turbine engine core having a compressor and a turbine at least partially within the nacelle;
   a fan bypass passage downstream of the fan between the nacelle and the gas turbine engine, for conveying a bypass airflow from the fan;
   a nozzle associated with a fan bypass passage, the nozzle comprising:
   a first flap;
   a second flap that is radially inwards of the first flap;
   at least one bladder located between the first flap and the second flap, the at least one bladder having flexible walls and a contained internal fluid pressure that is selectively variable to influence the bypass airflow, wherein the second flap moves radially inwards of the radially innermost wall into the fan bypass passage in a first position in response to an increase in the contained internal fluid pressure; and
   a controller that selectively varies the contained internal fluid pressure.

14. The gas turbine engine system recited in claim 13, wherein the first flap and the second flap are nominally radially equidistant from an engine centerline axis, wherein the at least one bladder is located adjacent the two flaps.

15. The gas turbine engine system recited in claim 13, wherein at east one flap is pivotally connected to the nacelle.

16. The gas turbine engine system recited in claim 13, further comprising a pressurized fluid source that selectively provides pressurized fluid to change the contained internal fluid pressure in response to a signal from the controller.

17. The gas turbine engine system recited in claim 13, further comprising at least one sensor near the nozzle that produces a signal representative of the contained internal fluid pressure, wherein the controller selectively varies the contained internal fluid pressure in response to the signal.

18. The gas turbine engine system recited in claim 17, wherein the at least one sensor is operative to produce a fault signal in response to a gradual decrease of the contained internal fluid pressure.

19. The gas turbine engine of claim 17 wherein the controller generates a fault signal in response to having to inflate the bladder a predetermined number of times over a predetermined time period.

20. The gas turbine engine system of claim 13, wherein the second flap defines an outer radial side of the fan bypass passage.

21. The gas turbine engine system of claim 13, wherein a cross sectional area is defined between the second flap and the gas turbine engine core.

22. The gas turbine engine system of claim 21, wherein the cross sectional area decreases in response to an increase in the contained internal fluid pressure.

23. The gas turbine engine system of claim 21, wherein the cross sectional area decreases as the second flap moves radially inwards and increases as the second flap moves radially outwards.

24. The gas turbine engine of claim 13, wherein the bladder is disposed outside of the fan bypass passage.

25. A method for controlling a bypass airflow through a fan bypass passage in a gas turbine engine, comprising the steps of:
   selectively varying a contained internal fluid pressure within a flexible bladder of a nozzle section adjacent the fan bypass passage to thereby move at least a first flap or a second flap, located radially inwards of the first flap, that the flexible bladder is between and influence the bypass airflow, wherein the first flap and the second flap abut the inflatable bladder at each of a plurality of positions: and
   communicating a signal representing the distance between an inner cowl and the second flap.

26. The method recited in claim 25, including increasing the contained internal fluid pressure to expand the nozzle section into the fan bypass passage to restrict the bypass airflow through the fan bypass passage.

27. The method recited in claim 25, including decreasing the contained internal fluid pressure to retract the nozzle section out of the fan bypass passage to augment the bypass airflow through the fan bypass passage.

28. The method recited in claim 25, including selectively varying the contained internal fluid pressure within a bladder of the nozzle section to move at least one flap adjacent the bladder.

29. The method recited in claim 25, wherein both the first flap and the second flap are moveable.

30. A variable fan nozzle for use in a gas turbine engine comprising:
   a nozzle section associated with a fan bypass passage for conveying a bypass airflow, the nozzle section having a contained internal fluid pressure that is selectively variable to influence the bypass airflow;
   at least one flap adjacent the nozzle section that moves between a plurality of positions in response to changes in the contained internal fluid pressure, wherein the at least one flap moves into the fan bypass passage in a first position in response to an increase in the contained internal fluid pressure; and
   at least one sensor near the at least one flap that produces a signal representative of a relative position of the at least one flap, wherein the sensor is on the at least one flap.

* * * * *